United States Patent [19]

Fong et al.

[11] Patent Number: 5,378,784
[45] Date of Patent: Jan. 3, 1995

US005378784A

[54] FLUORESCENT MONOMER AND POLYMER

[75] Inventors: Dodd W. Fong, Naperville; David J. Kowalski, LaGrange Park, both of Ill.

[73] Assignee: Nalco Chemical Company, Naperville, Ill.

[21] Appl. No.: 145,555

[22] Filed: Nov. 4, 1993

[51] Int. Cl.6 .................. C08F 212/32; C08F 216/10; C08F 220/06; C08F 220/28; C08F 220/68
[52] U.S. Cl. .................. 526/307.5; 526/307.7; 526/317.1; 526/320; 526/326; 526/328.5
[58] Field of Search ............ 526/307.5, 307.7, 317.1, 526/320, 326, 328.5; 560/100

[56] References Cited

U.S. PATENT DOCUMENTS 5,043,406 8/1991 Fong .
5,128,419 7/1992 Fong et al. .
5,298,583 3/1994 Heiliger et al. .................. 526/286

OTHER PUBLICATIONS

R. M. Lawrence and P. Perlmutter, Chemistry Letters No. 2, pp. 305–308, 1992.
DABCO-Catalyzed Coupling of Aldehydes with Activated Double Bonds, Hoffman et al, J. Org. Chem., 1985, pp. 3849–3859.

Primary Examiner—Joseph L. Schofer
Assistant Examiner—Wu C. Cheng
Attorney, Agent, or Firm—Robert A. Miller; James J. Drake

[57] ABSTRACT

3-Hydroxy-2-methylene-3-(1-naphthyl)propionic acid, methyl ester and fluorescent water soluble polymers prepared therefrom.

3 Claims, No Drawings

FLUORESCENT MONOMER AND POLYMER

INTRODUCTION

Polymers tagged with pendant fluorescent groups are generally easily monitored, even when present at low concentrations. Highly fluorescent molecules, that is, molecules which have a fluorescent quantum efficiency, or fluorescent quantum yield, within the range of from about 0.1 to about 1.0 and a light absorbance molar extinction coefficient of at least 1,000 are typically detectable at concentration ranges of parts per million ("ppm") to parts per billion ("ppb") or even less. The incorporation of such a highly fluorescent species into a polymer in the amount of one weight percent (based on polymer actives) will permit the detection of such polymer at polymer concentration levels down to 0.1 ppm or less, provided the fluorescent quantum yield and the light absorbance molar extinction coefficient of the fluorescent tagging agent are not significantly adversely affected by its attachment to the polymer.

There are several methods for tagging water soluble polymers. Such methods are described in U.S. Pat. Nos. 5,128,419 and 5,043,406. The disclosures of these patents are incorporated herein by reference.

A preferred method for incorporating fluorescent moieties into water soluble polymers is by copolymerization of an appropriate water soluble vinyl monomer with a vinyl compound possessing fluorescent properties. Illustrative of such a procedure is disclosed in U.S. Pat. No. 5,043,406. In this patent, a fluorescent monomer is copolymerized in small amounts with acrylic acid, acrylamide or copolymers thereof to provide tagged water soluble polymers.

The major drawback to this method of tagging water solubility is the availability of easily prepared fluorescent vinyl monomers. If such a monomer were available, it would be possible to inexpensively and simply prepare tagged water soluble polymers.

THE INVENTION

The invention provides to the art the new fluorescent vinyl monomer, 3-Hydroxy-2-methylene-3-(1-naphthyl)propionic acid, methyl ester. The invention also relates to the incorporation of 3-Hydroxy-2-methylene-3-(1-naphthyl)propionic acid, methyl ester into acrylic acid, acrylamide and copolymers of these two monomers. The amount of 3-Hydroxy-2-methylene-3-(1-naphthyl)propionic acid, methyl ester incorporated into such polymers may be within the range of 0.1–2.0 mole percent.

PREPARATION OF 3-Hydroxy-2-methylene-3-(1-naphthyl)propionic acid, methyl ester The reaction of activated bonds with aldehydes using 1,4-diazabicyclo [2,2,2] octane, DABCO, was reported by Hoffmann and Rabe, *J. Org. Chem.*, 1985, 50, 3849–3859. This article is incorporated herein by reference.

3-Hydroxy-2-methylene-3-(1-naphthyl)propionic acid, methyl ester is readily prepared by the reaction of 1-naphthaldehyde with a lower acrylate ester such as methylacrylate. Other acrylate esters such as ethylacrylate and the like may be used. The amount of acrylate ester should be in molar excess, 0.5–2 moles, in relation to the 1-naphthaldehyde.

The reaction is conducted using a catalyst soluble in the acrylate ester. A preferred catalyst is DABCO. Minor amounts of the catalyst eg. 0.05 to about 3% usually produces good yields. The reaction is preferably conducted at about room temperature eg. 24 degrees C plus or minus 5 degrees. The use of elevated temperatures is not desirable since it increases unwanted side reactions. Since room temperature is used the reaction requires from about 8 hours up to several days or more to produce substantial yields of 3-Hydroxy-2-methylene-3-(1-naphthyl)propionic acid, methyl ester.

EXAMPLE 1

This example illustrates the preparation of 3-Hydroxy-2-methylene-3-(1-naphthyl)propionic acid, methyl ester. Into a flask was placed the following charge:

| | | |
|---|---|---|
| Methylacrylate | | 25.8 g (0.3 m) |
| 1-Naphthaldehyde | 95% FW 156.18 | 32.9 g (0.2 m) |
| DABCO | | 3.33 g (0.07 m) |

It was allowed to stand for several days before being analyzed. The sample proved by analysis to contain 3-Hydroxy-2-methylene-3-(1-naphthyl)propionic acid, methyl ester. After standing for several weeks the sample thickened. Additional methylacrylate was added and additional 3-Hydroxy-2-methylene-3-(1-naphthyl)-propionic acid, methyl ester was formed.

Using the same procedure as set forth in Example 3 of U.S. Pat No. 5,043,406, which is incorporated herein by reference, a solution polymer of acrylic acid containing 2% by weight of 3-Hydroxy-2-methylene-3-(1-naphthyl)propionic acid, methyl ester was prepared. Analysis confirmed the incorporation of 3-Hydroxy-2-methylene-3-(1-naphthyl)propionic acid, methyl ester into the acrylic acid polymer.

Using the preparative techniques described in U.S. Pat No. 5,043,406, which is incorporated herein by reference, it is possible to prepare polymers of acrylamide and copolymers of acrylamide and acrylic acid incorporating 3-Hydroxy-2-methylene-3-(1-naphthyl)-propionic acid, methyl ester.

The polymers of the invention as described, when used to treat boilers to prevent scale, are easily monitored with respect to dosage due to the fluorescent nature of these polymers.

We claim:

1. A water soluble polymer from the group consisting of acrylic acid, acrylamide and mixtures thereof, which contains from 0.1–2.0 mole % of 3-Hydroxy-2-methylene-3-(1-naphthyl)propionic acid, methyl ester said water soluble vinyl polymer having been prepared by vinyl addition polymerization.

2. The water soluble vinyl polymer of claim 1 where the water soluble vinyl monomer is acrylic acid.

3. The water soluble vinyl polymer of claim 1 where the water soluble vinyl monomer is acrylamide.

* * * * *